(12) United States Patent
Vandal et al.

(10) Patent No.: US 8,993,104 B2
(45) Date of Patent: Mar. 31, 2015

(54) METHOD OF MAKING A COATED ARTICLE AND/OR GLAZING FOR AUTOMOBILES AND/OR THE LIKE

(71) Applicant: Guardian Industries Corp., Auburn Hills, MI (US)

(72) Inventors: Robert A. Vandal, Syracuse, IN (US); Harold Jordan, Wawaka, IN (US); Keith Aldrich, Waterloo, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 31 days.

(21) Appl. No.: 13/795,264

(22) Filed: Mar. 12, 2013

(65) Prior Publication Data
US 2014/0272338 A1     Sep. 18, 2014

(51) Int. Cl.
*B32B 3/00* (2006.01)
*B32B 17/10* (2006.01)
*C03C 17/25* (2006.01)
(Continued)

(52) U.S. Cl.
CPC ..... *B32B 17/10266* (2013.01); *B32B 17/10339* (2013.01); *C03C 17/25* (2013.01); *B32B 17/10348* (2013.01); *B41M 7/009* (2013.01); *B60J 1/001* (2013.01); *C03C 17/002* (2013.01); *C03C 17/008* (2013.01); *C03B 23/023* (2013.01); *C09D 1/02* (2013.01); *C09D 7/1216* (2013.01); *B41M 1/12* (2013.01);
(Continued)

(58) Field of Classification Search
CPC ....................................................... C03C 27/10

USPC ........................................................ 428/204
See application file for complete search history.

(56) References Cited

U.S. PATENT DOCUMENTS 5,137,560 A    8/1992   Ohmura et al.
5,383,990 A    1/1995   Tsuji
(Continued)

FOREIGN PATENT DOCUMENTS

DE    41 00 949      7/1992
DE    196 12 371    10/1997
(Continued)

OTHER PUBLICATIONS

CeramiGlass—OPH Product Data Sheet, possibly as early as Jan. 13, 2013, pp. 1-3.
(Continued)

*Primary Examiner* — Elizabeth Mulvaney
(74) *Attorney, Agent, or Firm* — Nixon & Vanderhye P.C.

(57) ABSTRACT

Certain example embodiments relate to a method of making a coated article and/or glazing (e.g., for automobile, window, and/or other applications). An opaque paint that is not technically a frit is used to form a desired opaque pattern. The paint is screen printed on a substrate. Screen printing parameters are selected, e.g., so that the mesh has a high threads per inch count; the paint is pushed through the screen using hydraulic forces that account for a sheer thinning property of the paint by balancing squeegee speed, squeegee angle relative to the screen, and hardness of the squeegee; and/or relative humidity above and/or near the screen is at least about 80%. Preferably, the paint is substantially fully curable at 400 degrees C. or less. The substrate with the pattern thereon may be bent using a high temperature process, optionally with another substrate to which it may be laminated.

20 Claims, 4 Drawing Sheets

Vehicle Exterior

Vehicle Interior

(51) Int. Cl.
  *B41M 7/00* (2006.01)
  *B60J 1/00* (2006.01)
  *C03C 17/00* (2006.01)
  *C03B 23/023* (2006.01)
  *C09D 1/02* (2006.01)
  *C09D 7/12* (2006.01)
  *B41M 1/12* (2006.01)
  *B41M 1/34* (2006.01)
  *C08K 3/00* (2006.01)

(52) U.S. Cl.
  CPC ............... *B41M 1/34* (2013.01); *C08K 3/0033* (2013.01); *C03C 2217/485* (2013.01); *C03C 2217/72* (2013.01)
  USPC .......................................................... 428/204

(56) References Cited

U.S. PATENT DOCUMENTS

| | | | |
|---|---|---|---|
| 5,443,669 A | 8/1995 | Tünker | |
| 5,498,284 A | 3/1996 | Neely, Jr. | |
| 5,510,188 A | 4/1996 | Vockler | |
| 5,681,610 A | 10/1997 | Boaz | |
| 6,158,247 A | 12/2000 | Didelot | |
| 6,318,125 B1 | 11/2001 | Diederen et al. | |
| 6,887,575 B2 | 5/2005 | Neuman et al. | |
| 7,056,588 B2 | 6/2006 | Neuman et al. | |
| 7,140,204 B2 | 11/2006 | Vandal | |
| 7,189,458 B2 | 3/2007 | Ferreira et al. | |
| 7,198,851 B2 | 4/2007 | Lemmer et al. | |
| 7,771,830 B2 | 8/2010 | Neuman et al. | |
| 7,998,320 B2 | 8/2011 | Laird et al. | |
| 2003/0186799 A1 | 10/2003 | Beyrle | |
| 2005/0003209 A1 | 1/2005 | Inoguchi et al. | |
| 2006/0159893 A1* | 7/2006 | Carney et al. | 428/195.1 |
| 2009/0053534 A1 | 2/2009 | Prunchak | |
| 2009/0115922 A1 | 5/2009 | Veerasamy | |
| 2009/0130195 A1* | 5/2009 | Acevedo-Duncan et al. | 424/450 |
| 2010/0252544 A1 | 10/2010 | Marquet | |
| 2012/0164420 A1 | 6/2012 | Lemmer et al. | |
| 2012/0219821 A1 | 8/2012 | Frank et al. | |
| 2013/0273320 A1* | 10/2013 | Bockmeyer et al. | 428/147 |

FOREIGN PATENT DOCUMENTS

WO  WO 01/42374  6/2001
WO  WO 2012/110513  8/2012

OTHER PUBLICATIONS

International Search Report mailed Jun. 24, 2014.

* cited by examiner

__US 8,993,104 B2__

METHOD OF MAKING A COATED ARTICLE AND/OR GLAZING FOR AUTOMOBILES AND/OR THE LIKE

Certain example embodiments of this invention relate to a method of making a coated article and/or glazing (e.g., for automobile, window, and/or other applications) and, more particularly, to a method of making a coated article and/or glazing that includes screen printing an opaque film from a water-inclusive and/or water-based paint on a substrate. The opaque film may in certain example embodiments be formed using a so-called "direct fired" paint and/or may be applied in a high relative humidity environment, e.g., to help ensure process ability.

BACKGROUND AND SUMMARY OF CERTAIN EXAMPLE EMBODIMENTS

Automotive glazings (e.g., windshields, backlites, etc.) typically include first and second glass substrates (also sometimes referred to as lites or plies) that are heated and bent to form a desired shape and then laminated to one another using a polymer-based or plastic interlayer (e.g., Poly Vinyl Butyral (PVB), ethyl vinyl acetate (EVA), and/or the like).

Devices and methods for heat bending glass sheets are well known in the art. For example, see U.S. Pat. Nos. 7,140,204; 6,318,125; 6,158,247; 5,443,669; and 5,383,990, the entire contents of which are hereby incorporated herein.

Processes to bend vehicle windshields include "double lite bending" and "single lite bending." In a double lite bending process, the two substrates are separated slightly, for example, by a powder layer and gradually heated to approximately 600 to 640 degrees C. and bent to form the desire shape. The powder layer may be composed of a material that remains inert at the process temperature range. The two bent substrates are then laminated to one another. In single lite bending process, each substrate is separately heated and bent before being laminated together.

Double lite bending is often preferred over single lite bending, especially in cases where the windshields have higher levels of curvature, e.g., because there is an improved probability of there being a good mutual fit of the substrates that, in turn, may result in higher quality optics and quality of lamination. By contrast, bending the substrates separately, even when formed using the same tools, has been found to reduce the probability of a good match. In this regard, it is known that forming on the same tool generally creates a mismatch of shape, as the laminated surfaces typically will be offset by at least the glass thickness. For instance, usually surface 2 and 4 have touched the tool in a single lite process, so surfaces 2 and 3 generally will not have the exact same curvature. Single lite bending processes oftentimes also are further limited in their ability to create windshields having differing substrates in terms of thickness and/or color/tint.

FIGS. 1-6 illustrate a prior art technique for making an automotive glazing with a screen printed opaque pattern using a double lite bending process. Referring to FIG. 1, the screen printing process includes a first glass substrate 10 screen printed in connection with a silk-screen drum 12 and wiper or doctor blade 13. The silk-screen drum 12 and wiper or doctor blade 13 cooperate to print an opaque material 11 onto a surface of the substrate 10 in a desired pattern. It is noted that as an alternative to printing drums, substantially flat, two-dimensional silk-screens sometimes are stretched into metal frames, with a silk-screen being stationary and a squeegee and flood bar being passed mechanically over the screen. The desired pattern oftentimes includes a solid or stylized frame around one or more edges of the substrate, e.g., to help conceal mounting brackets, sensors and/or other electronic devices, electrical connections, serve as a decorative perimeter band, protect the mounting adhesive from exposure to ultraviolet light and degradation, function as a solar control coating, etc.

The opaque material 11 may be of or include, for example, a ceramic frit. As is known, ceramic frits typically are composed of ground glass with a specific softening point combined with metals and oxides (e.g., bismuth (and/or an oxide thereof), nickel (and/or an oxide thereof), chromium oxide, cobalt oxide, and/or nickel oxide, etc.) to attain the desired color (often a dark or black color), adhesion properties, durability, etc.

Referring to FIG. 2, the screen-printed substrate 10' includes a screen-printed opaque layer 14. The screen-printed opaque layer 14 may be used, for example, on windshields, side lites, and/or backlites. The opaque layer 14 in the FIG. 2 example is applied to peripheral areas of the first substrate 10 to form a decorative perimeter band and to protect the mounting adhesive from exposure to ultraviolet light and degradation. The opaque layer 14 in this example may also be used to display a Department of Transportation (DOT) code and/or trademark, to hide trim components and/or sensor mounts, etc., as is conventional.

Ceramic frits may be suspended in a medium (for example, a medium of or including oils or water) to allow printing of the patterns in liquid form. The medium may include volatile materials. Accordingly, the screen-printed substrate 10' that includes the opaque layer 14 may first be introduced into a drying oven 15 as shown in FIG. 3 to pre-cure the opaque layer 14 and remove a majority of the medium before the screen-printed substrate 10' is introduced into the bending furnace or lehr (e.g., as shown in FIG. 5). Otherwise, introducing wet frit into the bending furnace may cause the volatile medium to flash off and contaminate the bending furnace, create craters or pinholes related to excessively rapid drying of the film, increase the risk of contamination of the wet material, and/or create difficulty in handling the wet-applied materials.

The drying oven 15 that pre-cures the opaque layer 14 may use any source of heat (for example, infrared or convection) or may substantially remove the volatile materials through ultraviolet radiation.

Once the applied opaque material 14 is dried via the pre-curing process, the screen-printed substrate 10' may be stacked with a second substrate 20 as illustrated in FIG. 4. The screen-printed substrate 10' and the second substrate 20 may be introduced into a bending furnace as illustrated in FIG. 5. Heat 30 is applied to soften the substrates so they can be bent, e.g., in a bending mold or frame. The screen-printed substrate 10' and the second substrate 20 are then separated and a laminating material 40 (e.g., PVB) is applied as illustrated in FIG. 6.

In selecting a material to form the opaque layer 14, a water- or oil-based frit sometimes will have adequate green strength (e.g., the initial adhesive strength of a material that allows it to be handled before it has completely cured or fired) to undergo typical handling operations before the bending and firing process illustrated in FIG. 5 if the screen-printed substrate 10' is pre-cured as illustrated in FIG. 3, e.g., to temperatures of approximately 270 to 380 degrees F. (132 to 193 degrees C.) when thermal drying systems are used. Although pre-curing the frit in this temperature range may provide an adequate green strength to enable the substrate with the material thereon to undergo typical handling prior to and/or in preparation for bending and/or firing processes, pre-curing the frit in this temperature range may still present several challenges. For example, because the dried frit is not permanently bonded to the glass substrate 10 at this point, it may be easily and potentially inadvertently scratched off, chipped away, and/or otherwise removed in whole or in part.

If there is a significant amount of frit present, volatiles may remain even after the pre-curing process. If the frit is on a glass surface exposed to the atmosphere of the furnace or lehr, the volatiles may simply escape to the environment as a result of the high temperatures associated with the bending processes. However, if the frit is between two glass substrates as illustrated in FIG. 5 (and for example, separated slightly by a powder layer as described above), the remaining volatiles may try to escape from the edges between the glass substrates 10 and 20. Unfortunately, however, these fumes may be partially or fully trapped, causing fogging and/or staining of the glass substrate surfaces. In some situations, the inability of the volatiles to completely escape and/or their tendency to build up on an inner surface may therefore lead to a disadvantageous aesthetic appearance.

Additionally, in order to achieve correct firing, the frit generally will need to pass through a softened state, during which there is a possibility that the liquidus frit will locally bond or fuse together the glass substrates 10' and 20, as even the separator powder oftentimes will be absorbed or saturated by the frit. It has been observed that even small fused areas may result in immediate or subsequent glass fractures, thereby reducing yield. This phenomenon oftentimes is exacerbated at areas of the substrates that are under high pressures, e.g., because of their shapes, contact with support or press tools, etc.

Attempts have been made to develop a "direct fire" solution. Such attempts generally have in the past attempted to use frit materials that have the lowest possible amount of volatiles prior to the substrates entering the bending furnace, while also having firing and/or softening points selected to try to avoid having the material be soft at times where pressures and/or relative motion of the plies are relatively high. In practice, this balance is very difficult to achieve, as the frit ultimately must be properly fired without driving a need to either under- or over-bend the windshield as a result of too much total heat. Indeed, as will be appreciated by those skilled in the art, this balance has made conventional direct fire surface 2 and surface 3 frit solutions unreliable and thus ill-suited for use in an everyday manufacturing environment.

Instead of pre-curing the frit in the lower temperature range described above, common solutions for double lite bending operations needing surface 2 frit applications involves printing a traditional frit while the substrate is in a flat state and pre-firing the frit at elevated temperatures of approximately 560 to 600 degrees C. (1040 to 1112 degrees F.). In this process, the risk of outgassing is reduced, as the volatiles and organics may be completely removed through the elevated temperatures. At such high temperatures, the frit likely will cross the softening point, achieving firing to the flat glass. As a result, a second heating process at elevated temperatures (e.g., associated with the bending furnace) will not necessarily result in a significant softening of the fired frit. The fired flat assembly may be paired with the mating glass ply with a separating powder and bent with the fired frit on surface 2 or surface 3, as desired. This process has been found to have a high rate of success, as the sticking or fusing and outgas sing issues are lessened.

Pre-firing the frit in this elevated temperature range, however, may also present a number of drawbacks. For example, the capital investment and floor space required for the pre-firing equipment is high. Significant energy is needed to heat the glass to the firing temperature and cool the glass twice. The repeated high-temperature and cooling processes also may inject delays into the process. Additionally, there exists the potential to create optical distortion and residual stress in the glass substrates during the pre-firing process that, in turn, may increase the likelihood of the glass breaking.

Thus, it will be appreciated that there is a need in the art for improved techniques for forming an opaque pattern on a substrate and/or in connection with a glazing for automotive, window, and/or other applications. For instance, it will appreciated that it would be desirable to provide a reliable screen printing process, e.g., in connection with a "direct fire" surface 2 and/or surface 3 applied opaque material, in a manner that is compatible with a double lite bending process, and potentially without the need for pre-firing in the flat state, for use in such applications.

In certain example embodiments of this invention, a method of making a glazing for an automobile is provided. A water-inclusive opacifying agent is screen printed, directly or indirectly, on a major surface of a first glass substrate in a desired pattern in connection with a screen mesh that has at least 200 threads per inch and while maintaining an environment that has a relative humidity of at least 80% over and/or proximate to the screen mesh. The first glass substrate with the opacifying agent thereon is heated to a first temperature sufficient to at least partially cure the opacifying agent in the desired pattern. The first glass substrate and a second glass substrate are bent in connection with a peak temperature higher than the first temperature. The first and second glass substrates are laminated together so that the cured opacifying agent is provided on an interior surface of the glazing.

According to certain example embodiments, the mesh may have at least 200 or at least 230 threads per inch, e.g., where a high resolution pattern is desired.

According to certain example embodiments, the relative humidity in the environment may be 90-95%.

According to certain example embodiments, the peak temperature may be at least twice as high as the first temperature. For example, the first temperature may be less than 200 degrees C. (e.g., about 125-150 degrees C.) and may cause at least a majority (and more preferably, at least 75-95%) of organic components provided in the opacifying agent to be driven off, and the peak temperature may be at least about 600 degrees C. and may cause the opacifying agent to fully cure.

According to certain example embodiments, the first temperature may be about 300 degrees C. and may be held for less than 10 (e.g., about 4) minutes. In such cases, the heating of the first glass substrate with the opacifying agent thereon to the first temperature may fully cure the opacifying agent by driving off all organic components initially provided therein.

According to certain example embodiments, the opacifying agent, when cured, may form an opaque or substantially opaque layer, and the first substrate may have a surface stress less than about 250 psi (more preferably less than about 150 psi) in an area proximate the opaque or substantially opaque layer.

In certain example embodiments of this invention, a method of making a coated article comprising a glass substrate and an opaque film is provided. An opaque paint is screen printed, directly or indirectly, on a major surface of the substrate in a desired pattern, while maintaining an environment with a relative humidity of at least 80% over and/or proximate to a mesh used in the screen printing. The first glass substrate is heated with the opaque paint thereon. The paint has a composition such that it is (a) fully cured when heated to a first temperature of 250-400 degrees, and (b) substantially fully cured when heated to a second temperature below 175 degrees C., in making the coated article.

According to certain example embodiments, at least the substrate with the opaque paint thereon may be bent to a desired shape, with the bending optionally being performed at a third temperature that is at least twice as high as the first temperature and at least three times as high as the second temperature.

According to certain example embodiments, the paint may be pushed through the screen, and the resulting deposit may be controlled, in connection with hydraulic forces that account for a sheer thinning property of the opaque paint, e.g., by balancing squeegee speed, squeegee angle relative to the screen, and/or hardness of the squeegee.

According to certain example embodiments, a method of making a laminated article is provided. A second glass substrate and a coated article made according to the method described three paragraphs above are booked together (optionally with a separator powder therebetween). The second glass substrate and the coated article are bent at a third temperature that is at least twice as high as the first temperature and at least three times as high as the second temperature. The second glass substrate and the coated article are laminated together (e.g., using PVB, EVA, PET, PU, and/or the like) in making the laminated article.

In certain example embodiments of this invention, a method of making a laminated article is provided. An opaque material is printed, directly or indirectly, on a major surface of a first glass substrate in a desired pattern in connection with a mesh that has at least 200 threads per inch. The opaque material is pushed through the screen in connection with hydraulic forces that account for a sheer thinning property of the opaque material by balancing (a) squeegee speed, (b) squeegee angle relative to the screen, and (c) hardness of the squeegee. The first glass substrate with the opaque material thereon is heated to a first temperature sufficient to at least partially cure the opaque material. The first glass substrate and a second glass substrate are bent in connection with a peak temperature higher than the first temperature. The first and second glass substrates are laminated together so that the cured opaque material is provided on an interior surface of the glazing.

These example embodiments, features, aspects, and advantages may be combined in various combinations and subcombinations to arrive at yet further example embodiments of the invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF CERTAIN EXAMPLE EMBODIMENTS

Figure 1:
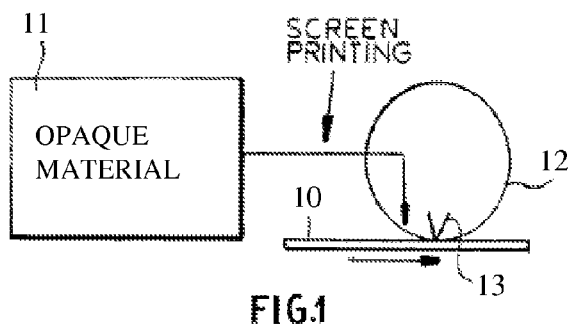
FIGS. 1-6 illustrate a prior art technique for making an automotive glazing with a screen printed opaque pattern.
Figure 2:
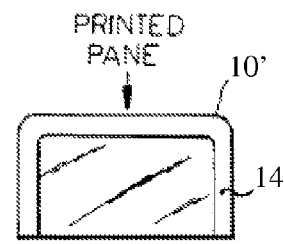
Figure 3:
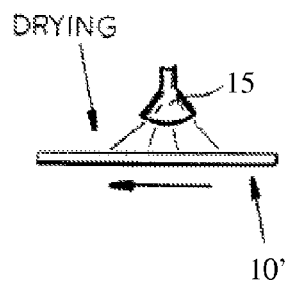
Figure 4:
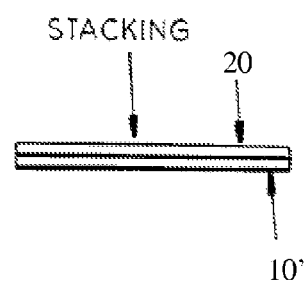
Figure 5:
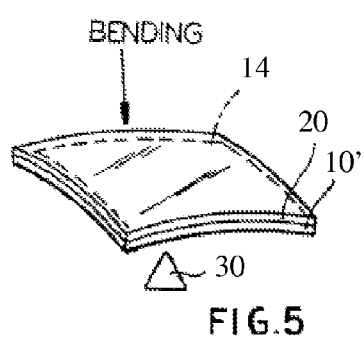
Figure 6:
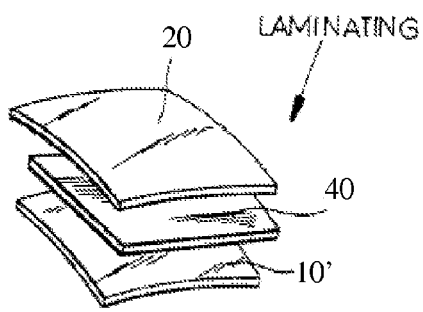

Certain example embodiments relate to improved techniques for forming an opaque pattern on a substrate and/or in connection with a glazing for automotive, window, and/or other applications. In certain example embodiments, a reliable screen printing process is used, e.g., in connection with a "direct fire" surface 2 and/or surface 3 applied opaque material, in a manner that is compatible with a double lite bending process. The need for pre-firing in the flat state may be eliminated in certain implementations.

In this regard, certain example embodiments involve a paint material that would not necessarily be regarded as a frit. The paint material that may be used in certain example embodiments may have inorganic base components, as materials with purely organic bases and conventional paints may not survive the high temperatures associated with bending the glass into the desired shape, laminating substrates together, and/or the like, and as it likely will be difficult to apply such materials to post-bent products. The paint material that may be used in certain example embodiments may have a low volatile content (e.g., to limit emissions and/or outgassing during manufacturing processes) and the ability to substantially or fully cure at temperatures significantly lower than those required to fire traditional frits and/or bend glass. Cerami-Glass, manufactured by Industrial Control Development, Inc., is one example opacifying material that includes fewer volatiles than ceramic frits and has found to be a suitable candidate for certain example embodiments, as it has these desirable properties. This water-inclusive opacifying material is described in U.S. Pat. No. 5,510,188, which is incorporated herein by reference. Of course, other materials that meet the desired characteristics specified herein also may be used in connection with different example embodiments.

A water-inclusive and/or water-based opacifying material that may be used in connection with certain example embodiments may be of or include a pigment, aqueous silicate solutions, alkali metal hydroxide, colloidal silica, and feldspar. More particularly, the material may be of or include (a) pigment; (b) an aqueous sodium silicate solution wherein the weight ratio of $SiO_2$ to $Na_2O$ is approximately 3; (c) an aqueous sodium silicate solution wherein the weight ratio of $SiO_2$ to $Na_2O$ is approximately 2; (d) an aqueous potassium silicate solution wherein the weight ratio of $SiO_2$ to $K_2O$ is approximately 2; (e) a colloidal silica thickening agent; (f) an aqueous alkali metal hydroxide solution; and/or (g) feldspar. The pigment may be a high temperature-resistant pigment including one or more metals and/or metal oxides, clay, and/or the like. For instance, the following and/or other materials may be used as pigments: iron, titanium, zinc, copper, and/or oxides thereof. The pigments may be provided in dry or powdered form, or in aqueous dispersions. A preferred material includes:

| Ingredient | Amount (Wt. %) |
|---|---|
| High temperature-resistant pigment | 37 to 43% |
| Aqueous sodium silicate solution ($SiO_2$ to $Na_2O$ weight ratio ≈3) | 11 to 16% |
| Aqueous sodium silicate solution ($SiO_2$ to $Na_2O$ weight ratio ≈2) | 15 to 24% |
| Aqueous potassium silicate solution ($SiO_2$ to $K_2O$ weight ratio ≈2) | 15 to 20% |
| Colloidal silica | 0.5 to 3% |
| Aqueous alkali metal hydroxide solution (30-60 wt. % conc.) | 3 to 7% |
| Feldspar | 1.5 to 3% |

Another desirable property of the paint material that may be used in certain example embodiments is that it avoid imparting significant residual stress on the glass substrate, e.g., resulting from a mismatch in coefficients of thermal expansion (CTEs) during bending processes. A CTE difference between the paint and the glass substrates preferable will be no more than 25%, more preferably no more than 15%, and still more preferably no more than 10%, e.g., under the elevated temperature conditions associated with the bending furnace or lehr. In certain example embodiments, the final induced surface stress directly under the paint preferably will be less than 500 psi, more preferably less than 250 psi, and still more preferably less than 150 psi.

The glazing with the opaque pattern applied using the paint material of certain example embodiments, and/or the opaque pattern itself, preferably should meet the durability and safety requirements for automotive glazings (e.g., when used in such applications) such as, for example, those prescribed by Federal Motor Vehicle Safety Standard 205 (FMVSS 205), and any specified vehicle original equipment manufacturer (OEM) requirements. The requirements may include, for example, penetration resistance; adhesion; resistance to heat, cold, and thermal cycling; ultraviolet resistance and/or blocking; resistance to humidity and chemical exposure; etc.

Water-inclusive materials may be used in certain example embodiments, as this may help avoid having to deal with volatiles that create stains and/or other issues as they outgas. Such materials also may be desirable because they have a curing temperature that is sufficiently low to help reduce issues of sticking and/or bonding during the double lite bending process. It has been observed, however, that such water-inclusive materials may nonetheless present certain challenges, especially when used with more conventional screen printing techniques. For instance, the shear thinning characteristic of a water-inclusive opacifying material typically will involve significantly different printing process conditions than prior art frit-related approaches (e.g., where conventional ceramic frits and/or enamels are used). Additionally, the nature of the opacifying material in combination with using water as the solvent may sometimes cause the material to air dry extremely quickly, e.g., when laid as a thin film. But because most automotive glass is printed using a silk screen process that typically leaves the opaque material as a thin film on the substrate with every printing cycle, rapid drying of the water-inclusive opacifying material may lead to a loss of print features. The probability of loss is particularly high for higher definition print features such as characters or dots. Even larger print features may be lost. Moreover, because some material may be left on the screen, it may dry and generate clogs that present subsequent printing problems.

Figure 7:
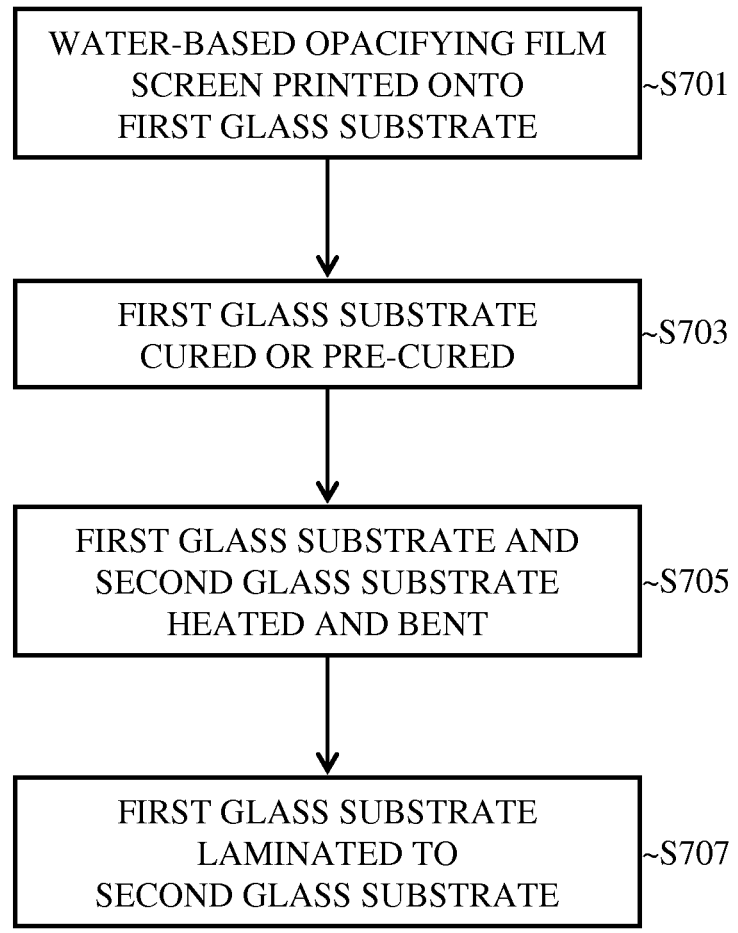
FIG. 7 is a flowchart illustrating an example method of making a glazing, according to certain example embodiments.

It has, however, been discovered process modifications that can be made that enable conventional screen printing techniques to be used in connection with a class of opacifying paints that have the desired properties discussed above and, referring now to the drawings, FIG. 7 is a flowchart illustrating an example method of making a glazing, according to certain example embodiments. In step S701, an opacifying film is screen printed directly or indirectly onto a first substrate. Because of the shear thinning properties of a water-inclusive opacifying material noted above, the water-inclusive opacifying film may be screen printed using a smaller mesh screen and/or in connection with significantly higher printing squeegee and flooding speeds, as compared to prior art techniques. For instance, it has been found that a smaller screen mesh is desirable. A screen mesh that includes greater than about 200 threads per inch is preferable, although a screen mesh with about 210 threads per inch or more is more preferable, and a screen mesh with about 220 threads per inch is yet more preferable.

It also has been observed that conventional screen printing approaches rely heavily on the sheer force generated between the squeegee and screen. The water-inclusive opacifying material of certain example embodiments may, however, benefit from an increase in hydraulic forces that help to push the paint through the screen and control the resulting deposit. Suitable hydraulic forces may be achieved by optimizing or otherwise tuning some or all of the squeegee speed, squeegee angle relative to the screen, and/or the hardness or durometer of the squeegee material. Although a conventional set of parameters for these factors would suggest to an operator that printing with the material of certain example embodiments is impossible, it has been found that it is possible to modify these factors, alone and in combination, to produce high-quality prints. The following operating parameters have been found to be suitable for use in certain example embodiments and are provided by way of example:

| Parameter | Preferred | More Preferred | Most Preferred |
| --- | --- | --- | --- |
| Squeegee print speed (mm/sec) | 200-1500 | 350-1250 | 500-1000 |
| Squeegee flood speed (mm/sec) | 200-1200 | 300-1000 | 400-600 |
| Squeegee durometer (or hardness, in shore A) | 25-80 | 40-65 | 50-55 |
| Squeegee angle (e.g., for squeegee holder, in degrees from horizontal) | 45-89 | 60-85 | 70-75 |

In addition, or in the alternative, to help reduce the likelihood of rapid drying and loss of image detail, the water-inclusive opacifying film may be screen printed in an atmosphere with increased humidity, when compared to prior art methods. In this regard, in certain example embodiments, the direct atmosphere over and/or proximate the screen may be set at least at about 80 percent relative humidity, and more preferably about 90-95 percent relative humidity. The increased humidity may be achieved by humidifying the entire printing area in certain example implementations. In other example implementations, it may be more preferable to create a cool mist more directly over and/or proximate the entire or substantially the entire screen. The mist may be provided using any suitable apparatus. For example, one or more ultrasonic and/or steam foggers may be used to increase the relative humidity to the desired levels. When one or more steam foggers is/are used, it may be desirable to keep heat associated therewith remote from the screen, e.g., using heat sinks, cooling fins, fans, and/or the like. Ultrasonic foggers generally generate less heat and also generally require less energy to operate and, as a result, may be more desirable and may not need to use cooling techniques.

Once the paint is applied to the substrate, the printed single glass lite that supports the coating may be dried and/or substantially fully cured or pre-cured, as indicated in step S703. The example materials contemplated herein preferably are fully cured, and have processing characteristics similar to fully fired frits, when heated to a temperature preferably below 225 degrees C., more preferably below 200 degrees C., and still more preferably below 175 degrees C. In some cases, the paint of certain example embodiments may be fully cured by heating to 125-150 degrees C. (257-302 degrees F.).

It is noted that one or more screen printing operations may be carried out to obtain the desired end product. Multiple printing operations may be consolidated and/or distributed so as to take place before and/or after the initial heating in step S703.

The first glass substrate with the now substantially fully cured and/or pre-cured coating thereon and the second substrate may be heated and bent in step S705. This may include, for example, stacking the substrates together and bending them using a high-temperature heating process in certain example embodiments. If the substrates are assembled in the desired stack and to be bent in the bending lehr relatively soon after this curing, then these lower temperatures have been found to be sufficient for creating high resolution patterns with acceptable process outputs and products.

It has, however, been observed that the paint may be subject to corrosion if cured at this lower temperature but exposed to humidity over an extended period of time. Thus, if there is a desire to store the cured material for extended periods before forming in the bending lehr, then it may be desirable to proceed with an elevated pre-cure temperature. For example, a temperature of at least 300 degrees C. for 4 minutes has been found to result in the complete or near complete elimination of the organic components that could lead to defects or discoloration while the intermediate product is in storage. In general, temperatures in the range of 200-500 degrees C., more preferably 250-400 degrees C., and times of 1-10 minutes, more preferably 2-5 minutes, are appropriate, although other temperatures and/or times may be used in different embodiments.

In the case of the lower temperature curing suitable for situations where it is envisioned that the intermediate products will not be stored for very long, the temperatures associated with the glass bending (e.g., 600-640 degrees C.) may be used to complete the curing process. These temperatures may or may not be useful in achieving final curing for situations where it is anticipated that the intermediate products will be stored and/or where prolonged exposure to humidity is possible, although the bending will expose the intermediate product to such elevated temperatures in any event. It has been found that in both cases, the bending process does not promote significant (or sometimes any) staining, discoloration, and/or the like, e.g., associated with outgassing. It similarly has been found that in both cases, the bending process does not promote significant (or sometimes any) sticking of the plies together.

Once bent, the substrates may be laminated to one another using a polymer based or plastic interlayer (e.g., PVB, EVA, polyurethane (PU), polyethylene terephthalate (PET), and/or the like) in step S707.

The techniques of certain example embodiments may be advantageous for a number of reasons. For example, the pre-curing process prior to booking the lites together and performing the double lite bending may involve less energy than conventional approaches, e.g., as the peak temperature preferably is about 300 degrees C. or lower, as opposed to conventional frits that typically are pre-cured at temperatures of 550 degrees C. or higher. As set for the above, in other example embodiments, a suitable water-inclusive opacifying film may be pre-cured at an even lower temperature, e.g., about 125 degrees C.

Reducing the energy required to pre-cure the opacifying layer may reduce the cost of making the coated article. In some instances, existing equipment used to dry solvents from typical frit materials may be used to pre-cure the water-inclusive opacifying layer. In those instances, additional capital equipment may not be required for these purposes, and certain example embodiments therefore may be implemented in connection with existing non-surface 2/3 screen printing lines.

Certain example embodiments also may reduce the possibility of optical distortions such as staining and the like, e.g., from the outgassing of volatiles. Certain example embodiments also may reduce the likelihood of the first and second substrates fusing or sticking together while being heated and bent.

Reducing the pre-cure temperature also may reduce the potential for distortions and/or residual stresses being introduced in the substrate supporting the screen printed coating. By contrast, residual stress and distortion from high temperature pre-curing is known to cause shape variations and residual stress issues in the final laminated product. Optical distortions (e.g., haze) resulting from such processes also can be reduced.

In certain example embodiments, the opacifying film will not contain heavy metals or other hazardous material that sometimes is found in prior art frits. Thus, certain example embodiments may improve the safety of the manufacturing process and present a reduced set of environmental challenges.

Figure 8:
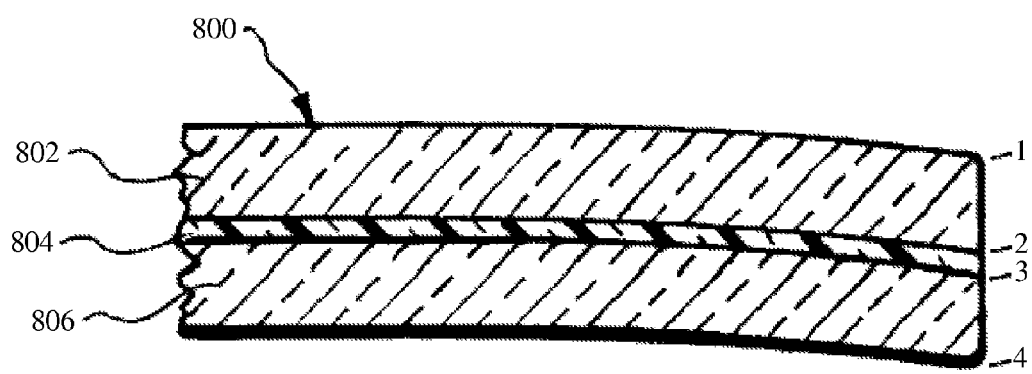
FIG. 8 is a schematic cross-sectional view of a glazing made according to certain example embodiments.

FIG. 8 is a schematic cross-sectional view of a glazing made according to certain example embodiments. Coated article 800 includes a first substrate 802, a laminate 804, and a second substrate 806. The laminate 804 may be a polymer based or plastic interlayer as indicated above. The glazing includes surfaces 1, 2, 3 and 4, in this order, and an opaque or substantially opaque pattern (not shown) on surface 2 and/or surface 3.

Although certain example embodiments refer to water-inclusive opacifying materials and/or the like (e.g., because they may include a large percentage of aqueous and/or other water-related materials), certain example embodiments may include alternate opacifying agents that have less than 50% water and/or use alternate base materials.

In a similar sense, alternative pigments may be used in different example embodiments, e.g., such that the paint is no longer opacifying and/or no longer creates an opaque film. For example, a wide variety of colors could be used in connection with a host of alternative pigments, e.g., to create articles with desired painted patterns that are opaque and/or at least partially light transmissive. In certain example embodiments, one or more colors may be screen printed on a substrate to create one or more desired patterns thereon. In certain example embodiments, at least a portion of the substrate will have a pattern screen printed thereon. This may include, for example, painting a pattern on one or both major surfaces of the substrate, e.g., over only a portion and/or substantially the entire area(s) thereof. One example is a single, substantially uniform color being screen printed on the entire or substantially the entire major surface(s) of the substrate.

It is noted that one or more low-E coatings may be used in connection with certain example embodiments. As is known, low-E coatings typically involve an infrared (IR) reflecting layer (e.g., of or including silver) sandwiched between first and second dielectric layers or dielectric layer stacks. The low-E coating(s) herein may include one or more IR reflecting layers. For example, certain example embodiments may incorporate the low-E coatings described and/or illustrated in any of U.S. Pat. Nos. 7,998,320; 7,771,830; 7,198,851; 7,189,458; 7,056,588; and 6,887,575; and/or U.S. Publication Nos. 2012/0219821; 2012/0164420; and 2009/0115922, the entire contents of each of which are all hereby incorporated herein by reference. The low-E coating may be provided on any one or more surfaces of a glazing (e.g., surfaces 1, 2, 3, and/or 4) in different example embodiments. When the low-E coating is provided on surface 2 and/or 3, it may for example be interposed between the respective substrate and any painted opacifying material also supported by the substrate.

Although certain example embodiments have been described in connection with double lite bending techniques for use in connection with automotive glazing applications, it will be appreciated that the example techniques disclosed herein may be used in connection with single lite bending techniques in this and/or other applications. For instance, this approach may be used in connection with commercial and/or residential windows or glazings (including monolithic, insulated glass unit, triple glaze, vacuum insulated glass unit, and/or other applications), solar cell applications (e.g., for protecting one or more peripheral edges of a substrate and/or superstrate, etc.), solar reflector type applications (e.g., for protecting one or more peripheral edges of a minor, encapsulating a surface 2 minor coating, etc.), and/or the like.

One or more of the substrates may be heat treated (e.g., heat strengthened and/or thermally tempered), and/or chemically tempered, in certain example embodiments. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments. The heat treatment may be performed at any suitable phase in the process. For example, the heat treatment may be performed before and/or after the screen printing.

Thus, it will be appreciated that certain example embodiments may involve a heat treated substrate with a substantially uniform, colored partially opaque layer disposed over all or substantially all of a major surface of the glass substrate. That substrate may be bent and/or left flat.

In this vein, it has been realized that the example techniques described herein can be used, for example, in connection with decorative applications, e.g., as a replacement to current techniques that generally involve having ceramic frit pattern coatings applied to the interior and/or exterior glass surfaces by either a silkscreen or roll coating process in monolithic, IG units, etc. Current processes generally involve each glass lite being heated to temperatures above 500 degrees C. to fire the frit into the glass, e.g., to create a strong bond between the frit and the glass, as described above. The 500 degree C. or higher thermal process is commonly conducted during the tempering process. Although this current approach is advantageous in that it in some ways "saves" a process step by combining thermal tempering with the frit's high-temperature firing process, the tempering process results in the glass being quenched, which introduces residual stresses in the glass that effectively prevents it from being cut and/or sized. As a result, the glass substrates generally will have to be pre-cut and/or sized prior to the tempering, which can make it difficult to reach economies of scale, e.g., by applying coatings to large stock sheets that can be cut to size.

More particularly, it has been realized that the example techniques described herein can be used to improve this process by, for example, applying a material that does not need to be fired above 500 degrees C. to fully adhere to the glass. Because the paints of certain example embodiments can be fired at a lower temperature and reach full bonding strength as a part of this process, the glass can be left in the annealed state and cut and/or sized at a later time. This approach therefore advantageously enables coating, painting, and/or other processes to take place in connection with large stock sheets of annealed glass that can later be sized, tempered, and built into intermediate and/or final products (which may be monolithic products, IG units, and/or the like, e.g., for commercial and/or residential applications).

Figure 9:
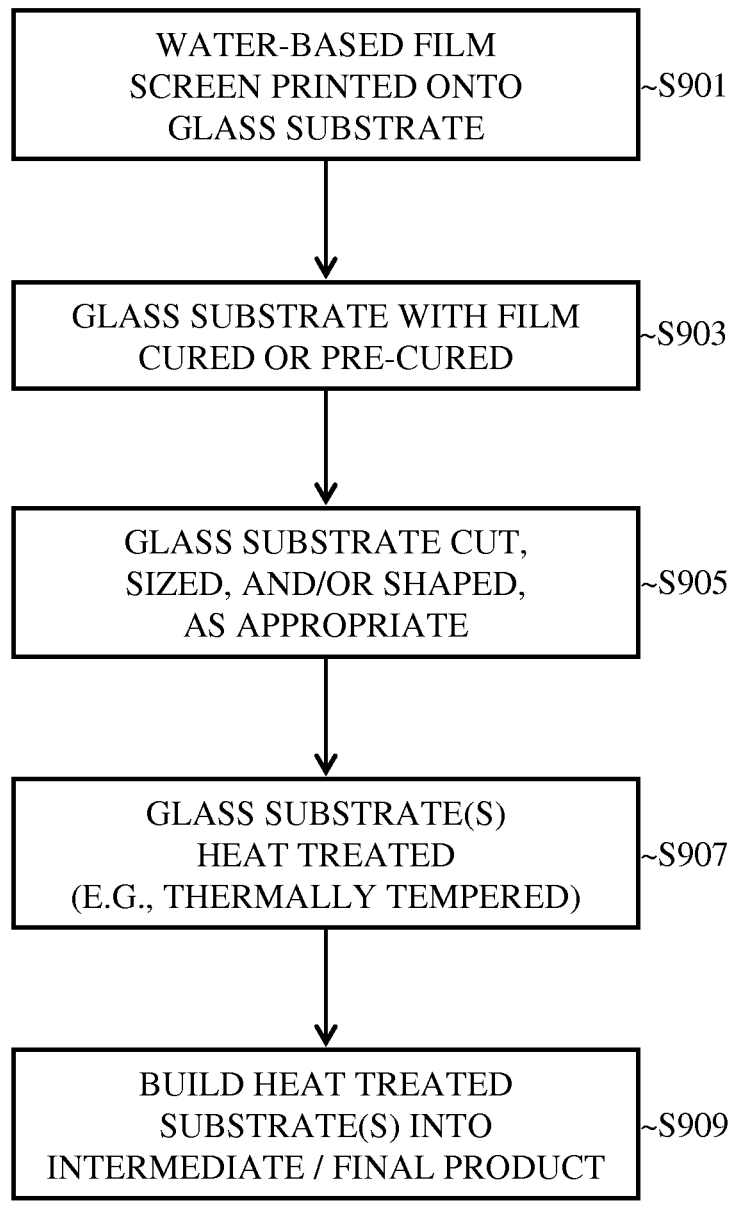
FIG. 9 is a flowchart illustrating an example method of making one or more painted articles, according to certain example embodiments.

FIG. 9 is a flowchart illustrating an example method of making one or more painted articles, according to certain example embodiments. In step S901, a water-based film is applied to at least one major surface of a substrate. The water-based film may have the example composition and/or properties as described above, and its application may be performed via silkscreening (e.g., in connection with the example process conditions set forth above) and/or roll coating. The water-based film may be applied over all, substantially all, or only a portion of the substrate in certain example embodiments. In certain example embodiments, different patterns with one or more different colors may be applied to the glass substrate. The substrate preferably is a glass substrate in the annealed state.

In step S903, the substrate with the film thereon is pre-cured and/or cured. Preferably, pre-curing (e.g., drying) and/or curing processes take place at temperatures below 400 degrees C. That is, certain example embodiments preferably involve fully or substantially fully adhering/bonding the water-based paint to the substrate in the desired pattern(s) at temperatures below about 400 degrees C. Temperatures in this range are advantageous because there is a reduced likelihood of their causing residual stresses in the substrate, especially as compared to higher temperatures and, for example, the temperatures typically associated with thermal tempering.

As a result of the low temperature firing of the inorganic paint material, the substrate with the paint thereon can be cut, sized, and/or shaped, as appropriate, as indicated in step S905. That is, in certain example embodiments, it is possible to silkscreen or roll coating an inorganic paint (e.g., of the type described herein) to an annealed glass substrate, and to adhere it to the glass substrate by curing and/or bonding processes that do not introduce high residual stresses in the glass, thereby making it possible to cut, size, and/or shape the substrate with the cured paint thereon.

Once the substrate is cut, sized, and/or shaped, the substrate or the substrates that are produced therefrom, can be left in the annealed state and, for example, built into an intermediate or final product, bonded to another substrate (e.g., to create a laminated product), etc. It is, however, possible to heat treat (e.g., heat strengthen and/or thermally temper) the substrate or the substrates that are produced therefrom in certain example embodiments, as indicated in step S907 in FIG. 9. This subsequent processing is possible because the paint survives subsequent tempering. More particularly, once the paint is cured, it does not re-melt at high temperatures (including those associated with thermal tempering). For example, the paint preferably does not re-melt at temperatures as 580 degrees C., more preferably 600 degrees C., still more preferably 620 degrees C., and sometimes even 650 degrees C. In step S909, the tempered substrate(s) may be built into an intermediate or final product, bonded to another substrate (e.g., to create a laminated product), etc. Monolithic applications with annealed and/or heat treated painted substrates include, for example, interior commercial (e.g., painted), spandrel, or printed patterned glass. The painted substrates in the annealed or heat treated state can be built into IG units, triple glaze products, VIG units, etc. Laminated products also may be produced and may, for example, involve first and second substrates laminated together with an interlayer such as, for example, PVB, EVA, PET, PMMA, PU, and/or the like; IG units with one of the lites being a laminated lite of this sort; etc. The painted surface may, in certain example embodiments, be an interior surface (e.g., a surface exposed to an interior of a building, a surface facing the cavity of an IG unit, etc.), although other arrangements are of course possible in different example embodiments.

Certain example embodiments preferably involve a paint that, at least initially, comprises 15-55 wt. % sodium silicates, more preferably 20-50 wt. % sodium silicates and, for example, is 26-40 wt. % sodium silicates. Additional silicate material may be provided, e.g., preferably in an amount that at least initially is 5-35 wt. % silicate material, more preferably 10-30 wt. % silicate material and, for example, may be 15-20 wt. % silicate material. Additional pigments and/or colorants may be added to achieve a desired coloration in connection with the fired product.

It is noted that high threads per inch counts may be used in connection with embodiments where it is desirable to provide for high resolution patterns. However, it is noted that "full flood" does not require the same high resolution to print images. Thus, a mesh count generally in the 100s will work. It therefore will be appreciated that the threads per inch may be from about 100-200 and the threads per inch may be selected so as to achieve full flood in certain example embodiments.

In certain example embodiments, a method of making a glazing for an automobile is provided. A water-inclusive opacifying agent is screen printed, directly or indirectly, on a major surface of a first glass substrate in a desired pattern in connection with a screen mesh that has at least 200 threads per inch (more preferably at least 230 threads per inch) and while maintaining an environment that has a relative humidity of at least 80% over and/or proximate to the screen mesh. The first glass substrate with the opacifying agent thereon is heated to a first temperature sufficient to at least partially cure the opacifying agent in the desired pattern. The first glass substrate and a second glass substrate are bent in connection with a peak temperature higher than the first temperature. The first and second glass substrates are laminated together so that the cured opacifying agent is provided on an interior surface of the glazing.

In addition to the features of the previous paragraph, in certain example embodiments, the relative humidity in the environment may be 90-95%.

In addition to the features of either of the two previous paragraphs, in certain example embodiments, the peak temperature may be at least twice as high as the first temperature.

In addition to the features of any of the three previous paragraphs, in certain example embodiments, the first temperature may be less than 200 degrees C.

In addition to the features of any of the four previous paragraphs, in certain example embodiments, the first temperature may be about 125-150 degrees C. and/or may causes at least a majority of organic components provided in the opacifying agent to be driven off, and/or the peak temperature may be at least about 600 degrees C. and causes the opacifying agent to fully cure.

In addition to the features of any of the five previous paragraphs, in certain example embodiments, the first temperature may be about 300 degrees C., and/or the first temperature may be held for about 4 minutes.

In addition to the features of the previous paragraph, in certain example embodiments, the heating of the first glass substrate with the opacifying agent thereon to the first temperature may fully cure the opacifying agent by driving off all organic components initially provided therein.

In addition to the features of any of the seven previous paragraphs, in certain example embodiments, the opacifying agent, when cured, may form an opaque or substantially opaque layer, and the first substrate may have a surface stress less than about 250 psi (more preferably less than about 150 psi) in an area proximate the opaque or substantially opaque layer.

In addition to the features of any of the eight previous paragraphs, in certain example embodiments, the opacifying agent may have an inorganic base.

In addition to the features of any of the nine previous paragraphs, in certain example embodiments, the opacifying agent may comprise pigment; a first aqueous sodium silicate solution wherein the weight ratio of $SiO_2$ to $Na_2O$ is approximately 3; a second aqueous sodium silicate solution wherein the weight ratio of $SiO_2$ to $Na_2O$ is approximately 2; an aqueous potassium silicate solution wherein the weight ratio of $SiO_2$ to $K_2O$ is approximately 2; a colloidal silica thickening agent; an aqueous alkali metal hydroxide solution; and feldspar.

In certain example embodiments, a method of making a coated article comprising a glass substrate and an opaque film is provided. An opaque paint is screen printed, directly or indirectly, on a major surface of the substrate in a desired pattern, while maintaining an environment with a relative humidity of at least 80% over and/or proximate to a mesh used in the screen printing. The first glass substrate with the opaque paint thereon is heated. The paint is (a) fully cured when heated to a first temperature of 250-400 degrees, and (b) substantially fully cured when heated to a second temperature below 175 degrees C., in making the coated article.

In addition to the features of the previous paragraph, in certain example embodiments, at least the substrate with the opaque paint thereon may be bent to a desired shape, with the bending optionally being performed at a third temperature that is at least twice as high as the first temperature and at least three times as high as the second temperature. In some cases, heat associated with the bending may eliminate remaining volatiles initially found in the opaque paint.

In addition to the features of either of the two previous paragraphs, in certain example embodiments, the paint may be pushed through the screen, and the resulting deposit may be controlled, in connection with hydraulic forces that account for a sheer thinning property of the opaque paint by balancing squeegee speed, squeegee angle relative to the screen, and hardness of the squeegee.

In addition to the features of any of the three previous paragraphs, in certain example embodiments, the screen mesh may have at least 230 threads per inch.

In certain example embodiments, a method of making a laminated article is provided. A second glass substrate and a coated article made according to the method of any of the previous 14 paragraphs may be booked together. The second glass substrate and the coated article may be bent at a third temperature that is at least twice as high as the first temperature and at least three times as high as the second temperature. The second glass substrate and the coated article may be laminated together in making the laminated article.

In certain a similar manner, an automotive glazing may in certain example embodiments be made in accordance with the method of any of the previous 15 paragraphs.

In certain example embodiments, a method of making a laminated article is provided. An opaque material is printed, directly or indirectly, on a major surface of a first glass substrate in a desired pattern in connection with a mesh that has at least 200 threads per inch (more preferably at least 230 threads per inch), with the opaque material being pushed through the screen in connection with hydraulic forces that account for a sheer thinning property of the opaque material by balancing (a) squeegee speed, (b) squeegee angle relative to the screen, and (c) hardness of the squeegee. The first glass substrate with the opaque material thereon is heated to a first temperature sufficient to at least partially cure the opaque material. The first glass substrate and a second glass substrate are bent in connection with a peak temperature higher than the first temperature. The first and second glass substrates are laminated together so that the cured opaque material is provided on an interior surface of the glazing.

In addition to the features of the previous paragraph, in certain example embodiments, an environment with a relative humidity of at least 80% may be maintained over and/or proximate to the mesh while printing.

In addition to the features of either of the two previous paragraphs, in certain example embodiments, the first substrate may have a surface stress less than about 150 psi proximate the cured opaque material.

While a paint, film, layer, layer system, coating, or the like, may be said to be "on" or "supported by" a substrate, layer, layer system, coating, or the like, other layer and/or materials may be provided therebetween. Thus, for example, the paint described above may be considered "on" and "supported by" the substrate even if other layer(s) (e.g., low-emissivity or low-E coatings) are provided therebetween.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a laminated glazing for an automobile, the method comprising:
   screen printing a water-inclusive opacifying agent, directly or indirectly, on a major surface of a first glass substrate in a desired pattern in connection with a screen mesh that has at least 200 threads per inch and while maintaining an environment that has a relative humidity of at least 80% over and/or proximate to the screen mesh;
   heating the first glass substrate with the opacifying agent thereon to a first temperature sufficient to at least partially cure the opacifying agent in the desired pattern, said first temperature being less than 200 degrees C.;
   following said heating to the first temperature and said at least partial curing, bending the first glass substrate and a second glass substrate in connection with a second temperature higher than the first temperature, said second temperature used in bending the glass substrates being at least about 600 degrees C.; and
   laminating together the first and second glass substrates so that the cured opacifying agent is provided on an interior surface of the glazing.

2. The method of claim 1, wherein the screen mesh has at least 230 threads per inch.

3. The method of claim 1, the relative humidity in the environment is 90-95%.

4. The method of claim 1, wherein the second temperature is at least twice as high as the first temperature.

5. The method of claim 1, wherein the first temperature is about 125-150 degrees C. and causes at least a majority of organic components provided in the opacifying agent to be driven off.

6. The method of claim 5, wherein the second temperature causes the opacifying agent to fully cure.

7. The method of claim 1, wherein the first temperature is about 300 degrees C.

8. The method of claim 7, wherein the first temperature is held for about 4 minutes.

9. The method of claim 8, wherein the heating of the first glass substrate with the opacifying agent thereon to the first temperature fully cures the opacifying agent by driving off all organic components initially provided therein.

10. The method of claim 1, wherein the opacifying agent, when cured, forms an opaque or substantially opaque layer, and the first substrate has a surface stress less than about 250 psi in an area proximate the opaque or substantially opaque layer.

11. The method of claim 1, wherein the opacifying agent, when cured, forms an opaque or substantially opaque layer, and the first substrate has a surface stress less than about 150 psi in an area proximate the opaque or substantially opaque layer.

12. The method of claim 1, wherein the opacifying agent has an inorganic base.

13. The method of claim 1, wherein the opacifying agent comprises:
   pigment;
   a first aqueous sodium silicate solution wherein the weight ratio of $SiO_2$ to $Na_2O$ is approximately 3;
   a second aqueous sodium silicate solution wherein the weight ratio of $SiO_2$ to $Na_2O$ is approximately 2;
   an aqueous potassium silicate solution wherein the weight ratio of $SiO_2$ to $K_2O$ is approximately 2;
   a colloidal silica thickening agent; and
   an aqueous alkali metal hydroxide solution.

14. A method of making a coated article comprising a glass substrate and an opaque film, the method comprising:
   screen printing an opaque paint, directly or indirectly, on a major surface of the substrate in a desired pattern, while maintaining an environment with a relative humidity of at least 80% over and/or proximate to a mesh used in the screen printing;
   heating the first glass substrate with the opaque paint thereon, wherein the paint is (a) fully cured when heated to a first temperature of 250-400 degrees, and (b) substantially fully cured when heated to a second temperature below 175 degrees C., in making the coated article.

15. The method of claim 14, further comprising bending to a desired shape at least the substrate with the opaque paint thereon, the bending being performed at a third temperature that is at least twice as high as the first temperature and at least three times as high as the second temperature.

16. The method of claim 15, wherein heat associated with the bending eliminates any remaining volatiles initially found in the opaque paint.

17. The method of claim 15, wherein the paint is pushed through the screen, and the resulting deposit is controlled, in connection with hydraulic forces that account for a sheer thinning property of the opaque paint by balancing squeegee speed, squeegee angle relative to the screen, and hardness of the squeegee.

18. The method of claim 14, wherein the screen mesh has at least 230 threads per inch.

19. A method of making a laminated article, the method comprising:
   booking together a second glass substrate and a coated article made according to the method of claim 14;
   bending the second glass substrate and the coated article at a third temperature that is at least twice as high as the first temperature and at least three times as high as the second temperature;
   laminating together the second glass substrate and the coated article in making the laminated article.

20. An automotive glazing made in accordance with the method of claim 1.

\* \* \* \* \*